Patented Aug. 10, 1948

2,446,536

UNITED STATES PATENT OFFICE 2,446,536

TREATMENT OF STYRENE-ISOBUTYLENE POLYMER FILMS AND RESULTANT PRODUCT

Paul E. Hardy, Elizabeth, N. J., assignor to Standard Oil Development Company, a corporation of Delaware No Drawing. Application May 12, 1945, Serial No. 593,543

3 Claims. (Cl. 117—118)

This invention relates to novel and improved products such as self-supporting films or sheets and other shaped articles made of high molecular weight synthetic copolymers, and to methods of manufacturing such improved products. More particularly, it relates to the chemical treatment of the surface of sheet films or other shaped articles made of such high molecular weight copolymers. For instance, the invention may be illustrated by treating the surface of a thin, flexible sheet of a styrene-isobutylene copolymer by nitration or sulfonation of merely sufficient intensity to alter the surface characteristics of the film without materially modifying the inherent properties of the body of the film.

Copolymers of styrene and isobutylene, and more generally copolymers of aliphatic olefins with polymerizable cyclic compounds, are disclosed in U. S. Patent 2,274,749. The general method of preparing such copolymers is also disclosed therein and consists essentially in carrying out the copolymerization of the mixed reactants at a temperature below 0° C. such as —10° C., —50° C., —80° C., —100° C., or even lower, in the presence of an active halide polymerization catalyst, and preferably in the presence of an inert, volatile organic liquid serving as solvent and refrigerant.

Instead of styrene, other polymerizable cyclic materials may be used such as alphamethyl styrene, paramethyl styrene, alphamethyl paramethyl styrene, indene, terpene, coumarone, etc., as well as copolymers of indene and coumarone.

Instead of isobutylene, other isoolefins may be used such as isoamylene, particularly 2-methyl-2-butene, isooctylene, etc., as well as other aliphatic olefins such as propylene, normal butylene, etc.

The proportions in which the styrene or other polymerizable cyclic material and the isobutylene or other aliphatic olefin material may be copolymerized may vary over a wide range from 1% to 50% or 90% or even 99% of the polymerizable cyclic constituent. In fact, an even smaller amount of such cyclic material may be used such as even 0.1% or less, it being sufficient to have merely a few molecules of the styrene or other polymerizable cyclic material combined into a relatively long chain of isobutylene or other aliphatic olefin, the aromatic nucleus of the styrene serving as a means by which the high molecular weight resultant copolymer may be subjected to the subsequent surface chemical reaction according to the present invention.

For convenience and brevity, the above described copolymer of a cyclic polymerizable material and an olefin will be referred to as a cycalkene copolymer. The specific type of copolymer made from styrene and isobutylene will similarly be referred to for brevity as stybutene. The invention will be illustrated as applied particularly to stybutene, although it is not to be limited thereto.

The copolymer to be used may also be a tripolymer of a polymerizable cyclic compound, an olefinic compound and a small amount, between 0.1%–30% or so, preferably 0.5%–10% of a diolefin, e. g., isoprene, butadiene, etc. One example of such a tripolymer is one comprising about 50% of isobutylene, 47% of styrene and 3% of isoprene, in the combined state.

Still further copolymers may be used such as those made by copolymerizing a diolefin such as butadiene, isoprene, etc. or other polyolefins, with a polymerizable cyclic compound which after copolymerization, will still contain a reactive cyclic nucleus such as the benzene ring in a styrene group, as for instance, copolymers of styrene with 1–40% or so of butadiene or isoprene.

When copolymers such as those described above, are sheeted out into self-sustaining films, for instance for use as moisture-proof wrapping material, etc., or extruded or otherwise molded into various shaped articles, their surfaces sometimes have slightly tacky characteristics or have excessively high solubility in fatty or mineral oils, or other materials with which they come in contact, and accordingly, it is one object of the present invention to modify the surface characteristics of such copolymers in a way to eliminate such disadvantages.

Broadly, the present invention comprises treating with a chemical modifying agent a surface comprising an active copolymer of any of the above types, which may all be included within the class of copolymers of a polymerizable cyclic compound and at least one polymerizable aliphatic compound.

The invention may be applied in several different ways, such as either by treating the surface of articles consisting entirely of copolymer such as a thin, flexible sheet or film consisting essentially of a stybutene or other copolymer, or it may be applied to articles made of some other material such as wood, tile, clay, paper, cloth, etc., which has been coated and/or impregnated with copolymer.

In applying to articles of which the body consists essentially of copolymer, such articles may be sheet materials which can either be relatively thick such as 1/16 inch, 1/8 inch, or even 1/4 inch or more in thickness, such as would be suitable for use as window glass, wall covering, containers for solids or liquids, etc., or else much thinner sheets or films which are much more flexible, e. g., having a thickness of .02 inch, .01 inch, .005 inch, .001 inch or even thinner. Such various sheet material made of copolymer may be either used alone or laminated with other materials such as paper, cloth, wood, glass, etc., or other synthetic plastics such as cellulose acetate, polymethyl methacrylate, polyvinyl chloride or esters, polystyrene, etc., or natural rubber or synthetic rubber either of the highly unsaturated type such as those made by emulsion polymerization of 75% of butadiene and about 25% of styrene or of acrylonitrile, or only slightly saturated synthetic rubber such as that made by low-temperature copolymerization of isobutylene containing about 1% to 10% or so of a diolefin such as isoprene, butadiene, etc.

In making such shaped articles of copolymer, various materials may be mixed therewith as is known to the art, such as pigments, dyes, carbon black, clay, chalk, silica, magnesium, zinc oxide, etc., or various liquid or solid organic materials such as paraffin wax, petrolatum, small amounts of mineral oil or fatty oils, bituminous materials such as tar, asphalt, etc., or various rubbery materials such as natural or synthetic rubber such as those mentioned above, or high-molecular weight polyisobutylene, or various natural or synthetic resins and plastics, such as those mentioned above, or others such as phenol formaldehyde resins, urea formaldehyde resins, polyamide, casein plastics, ethyl cellulose, polyethylene, polyethylene oxides, chlorinated rubber, cyclized rubber, vinylidene chloride polymers and copolymers, organosilicon polymers, etc.

If the invention is to be applied to a sheet material, molded article, etc., which has been coated or impregnated with copolymer but has a base made of some other material such as paper or other fibrous material, or sheet metal, etc., the coating or impregnating with the copolymer may be carried out by various methods known to the art, such as by dipping or immersion, spraycoating, roll-coating, etc., either using a molten bath of the copolymer or a volatile solvent solution of the copolymer, which may or may not be heated. If a volatile solvent has been used in such a process, it is preferable to remove the volatile solvent by evaporation or vacuum drying, before applying the chemical treatment to the surface according to the present invention.

The chemical treatment of the copolymer surface according to this invention, may be carried out with many types of chemical modifying agents, including any of the oxygen-containing inorganic acids reactive therewith, preferably those capable of reacting with the aromatic or other cyclic nucleus in the polymerizable cyclic constituent of the copolymer. Sulfuric acid is a preferred treating agent, and nitric acid is also very suitable. These acids may either be used in the normally available concentrated form or in the form of fuming acid such as fuming sulfuric acid or fuming nitric acid, or as a mixture of concentrated and fuming acids. Mixtures of different types of acids such as a mixture of nitric and sulfuric acid may be used. Other acids coming within the scope of the invention include sulfur trioxide, chlorsulfonic acid, and fluorsulfonic acid, sulfamic acid, etc. Other reagents may be used such as halogens, e. g. chlorine, bromine, etc., and sulfur-halides, e. g. $S_2Cl_2$, and $SCl_2$, alkyl halides, e. g., amyl chloride, organic acid anhydrides, e. g., acetic anhydride, etc.

It is understood that the acid concentration, the temperature of treatment and the time of treatment, are variable factors which are intimately inter-related with each other and therefore must be adjusted and controlled according to the shape and type of article being treated and according to the materials used and type of equipment available for effecting the treatment. For instance, if the equipment design and other questions involved require short treating time, it is preferable to use relatively strong, e. g., fuming acid, perhaps also with some application of heat, or else to use ordinary concentrated acids at a much higher temperature, whereas when more treating time is available, it may be preferred to use only concentrated acids at milder temperatures, or even slightly diluted acids at more or less elevated temperatures. A combination of various treatments may also be used, such as a mild treatment at first, then followed by a more severe final treatment. The ordinary limits of temperature range to be used will be from about 0 to 100° C., preferably about 20 to 40° C., and the treating time will normally range from about 1 to 30 seconds or so for the faster treatment, or periods ranging from 1 minute to an hour or more, for the slower type of treatment.

One preferred combination of conditions comprises the use of an acid strength of about 60 to 70 volume % of fuming acid in concentrated acid, at a temperature of about 20 to 30° C., for a contact time of about 1 to 30 seconds, these conditions applying particularly for using a stybutene containing about 40% to 60% of combined styrene having an intrinsic viscosity of about 0.6 to 1.5.

After the chemical treatment has been completed and the surface-treated article has been satisfactorily washed and dried, it may, if desired, be subsequently subjected to further shaping or forming operations, such as by folding into the shape of a bag or a box or it may be cut into strips or sheets of any desired size, or it may be laminated with other sheet materials such as paper, cloth, metal foil or sheets of plastics such as regenerated cellulose, cellulose acetate, etc. The surface treatment of this invention may, if desired, be applied to only one side of a sheet or film of copolymer, in which case the resultant films can advantageously be laminated with other materials, whereby the different properties of the treated and untreated copolymer surfaces can be used to best advantage.

The objects, advantages, and details of the invention will be better understood from a consideration of the following experimental data:

*Example 1*

A stybutene film having a thickness of about 0.002 inch and made of a stybutene having a combined styrene content of about 60% and having an intrinsic viscosity of about 0.7, which had been made at a temperature of about −90° C., using $AlCl_3$ as catalyst, and had been sheeted by calendering, was subjected to a surface nitration, by immersion in concentrated nitric acid, i. e., of 70% strength, at a temperature of about 25° C. No substantial reaction had apparently taken place after about 30 minutes, but after about 16 hours there was evidence of reaction. The product resulting from such mild treatment is useful for applications where only a small but very well controlled amount of surface modification is desired.

Example 2

Example 1 was repeated except that fuming nitric acid was used instead of the concentrated nitric acid, the fuming acid being of about 95% strength. Reaction was very vigorous as was evidenced by the rapid clouding of the film and the evolution of heat and nitric oxide. In this particular example, the product was badly shrunk and warped for exposure times over 3 seconds, indicating that the only way that such a vigorous treatment could be used commercially would be to use a very short contact time, such as about 2 seconds or less.

Example 3

Example 1 was repeated again, but this time with a mixture of 25% of concentrated nitric acid and 75% by volume of fuming nitric acid, so that the mixed acid used had in effect a strength of about 90%. The temperature was about 25° C., and the time of contact was about 6 to 10 seconds. After the nitration treatment, the film was thoroughly washed with water, in order to remove any residual nitric acid, and the surface-nitrated stybutene film was found to be very similar to the original film in all respects except in transparency and solubility characteristics. The slight cloudiness caused by the nitration treatment might be a slight disadvantage for some purposes, but would not be objectionable for many other uses. The primary advantage resulting from the surface treatment is the production of an entirely tack-free surface which is insoluble in many different solvents such as: benzene, toluene, naphtha, gasoline and hydrocarbons in general; also vegetable oils, fats and greases, so the resulting film is especially suitable for use alone or laminated with paper, regenerated cellulose, etc., as a wrapper for food products and other materials and as a liner for containers for oils, waxes, foods, etc.

Example 4

Another film of stybutene having a combined styrene content of about 60%, an intrinsic viscosity of about 0.7, the film being of a thickness of about 0.002 inch, was subjected to surface-sulfonation by immersion in a sulfuric acid mixture containing about 65% fuming sulfuric acid and 35% concentrated sulfuric acid by volume at a temperature of about 25° C. for about 20 seconds.

This surface-sulfonation of the stybutene film produced just as good insolubilizing effects as did the nitration, but did not cause any cloudiness. The oil-resistance of the sulfonated film was very good, and even after standing for 6 months in toluene at room temperature, it had not dissolved, whereas the untreated stybutene film would have dissolved in the toluene in less than 5 minutes.

Example 5

A series of tests was made by pulling a calendered sheet of stybutene having a thickness of about 0.004 inch, a width of 6 inches, and a length of 6 feet through a mixture of concentrated and fuming acids which was contained in a glass dish. After passing the film through the acid it was passed through water to remove the residual acid from the surface of the film. Care had to be taken at this point because if there was too much acid on the film, the film would become crinkled due to the heat evolved when the acid contacted the water. This was particularly true if the film had a considerable amount of orientation. The speed at which the film was pulled through the bath was regulated so that the contact time in the acid was about 15 seconds.

Acid concentrations ranging from about 60% to 75% by volume of fuming nitric acid in concentrated nitric acid were used. The stybutene film used was made of copolymer having an intrinsic viscosity of about 0.8 and a combined styrene content of about 45% and containing 2% of zinc stearate (which had been milled into the stybutene in order to facilitate removal of the calendered sheet from the calendering roll).

In these tests, it was found that mixtures containing from 60 to 70 volume per cent fuming nitric acid in concentrated nitric acid worked best under the conditions used, i. e., at a temperature of about 25° C., and with a 15 second contact time. Mixtures containing 75 volume per cent of fuming nitric acid were too strong for the 15 second contact time, but could be used satisfactorily with a shorter contact time, e. g., 10 seconds, 5 seconds, or even less.

Several of these surface-nitrated stybutene films were evaluated as to moisture vapor penetration, solvent resistance, and tensile strength and elongation both with the grain and across grain. The results were as follows:

| Sample | Vol. percent fuming $HNO_3$ in conc. $HNO_3$ | M. V. P.[1] | Solvent Resistance, Minutes[2] | Physical Properties | | | |
|---|---|---|---|---|---|---|---|
| | | | | with grain | | across grain | |
| | | | | Tens. | Elong. | Tens. | Elong. |
| | | | | #/in.² | Percent | #/in.² | Percent |
| 1 | no treatment | 0.50 | 0.3 | 1215 | 475 | 800 | 525 |
| 2 | 60 | 0.53 | 5 | 750 | 495 | 500 | 545 |
| 3 | 64 | 0.69 | >15 | 845 | 430 | 615 | 545 |
| 4 | 69 | 0.80 | [3]>>15 | ([4]) | 340 | ([4]) | 480 |
| 5 | 73 | 1.19 | [3]>>15 | ([4]) | 75 | ([4]) | 75 |

[1] g$H_2O$/sq. m./24 hrs. based on a 0.004 inch sheet as determined by ASTM Method D697-42T (Method A), conditions of which are 25° C., 50% R. H., $CaCl_2$ inside cup.
[2] This is the time required for benzene to work through the film.
[3] Times greater than 10 minutes are difficult to measure because the benzene evaporates more rapidly than it penetrates.
[4] No pull was registered on the tensile machine.

These data show that the surface-nitration of the stybutene film causes a considerable reduction in tensile strength and some increase in moisture-vapor penetration, particularly with the stronger acid treatments, although neither of these disadvantages are very serious if the treatment is carried out with an acid mixture containing less than 65 volume per cent of fuming nitric acid in concentrated nitric acid. On the other hand, the solvent resistance of the surface-treated stybutene film is tremendously better than that of the untreated film, which is attacked very quickly by benzene. This property was measured by determining the length of time required for a drop of benzene to work through the film, and ordinarily a stybutene film will hold up under this test for only 15 to 20 seconds, whereas most of the nitrated films were so far superior that it was difficult to apply the test accurately from a numerical point of view.

Example 6

A series of tests similar to those carried out under Example 5 was also applied to a stybutene film having a combined styrene content of about 60% and an intrinsic viscosity of about 0.7, and the results obtained were substantially similar to those obtained in Example 5 where a stybutene having a combined styrene content of about 45% was used.

Example 7

Tests similar to those carried out in Examples 5 and 6, were also applied to stybutene films having a combined styrene content of 45% and 60% respectively, using various mixtures of fuming sulfuric acid in concentrated sulfuric acid, and here also, the results indicated that the most satisfactory surface sulfonation was effected by the use of a mixture containing about 60 to 70 volume per cent of fuming sulfuric acid in concentrated sulfuric acid, under the particular conditions used, i. e., the same as in Example 5. The sulfuric acid mixtures were not as easy to handle as the nitric acid mixtures because of the higher viscosity of the sulfuric acid, which caused more acid to cling to the treated film so that extra care was required in the water bath to prevent crinkling of the treated film during washing. Such danger of crinkling can, however, be substantially reduced or eliminated by first rinsing the freshly treated film in a dilute sulfuric acid bath and then finally washing in plain water, or most of the acid can first be removed from the treated film by some sort of scraping device, or a combination of these methods can be used.

In the appended claims "dipolymer" and "tripolymer" are intended to mean polymers of 2 or 3 monomers respectively.

It is not intended that this invention be limited to the specific materials which have been given merely for the sake of illustration, but only by the appended claims in which it is intended to claim all novelty inherent in the invention as well as all modifications coming within the scope and spirit of the invention.

What is claimed is:

1. A thin, flexible, continuous, self-sustaining film of styrene-isobutylene copolymer having an intrinsic viscosity of about 0.6 to 1.0 and about 60% by weight of combined styrene, only the surface of which has been nitrated so that the interior portion of said film is not nitrated, said film having moisture vapor penetration characteristics substantially as good as those of a film of untreated copolymer, but said treated film having much better solvent-resistance to fatty oils than a film of untreated copolymer.

2. An article having its surface only nitrated without nitrating the interior portion of said article and comprising a styrene-isobutylene copolymer, having an intrinsic viscosity of 0.6 to 1.0 and having about 60% combined styrene.

3. A process for treating the surface of an article formed from a copolymer of about 40-60% by weight of a styrene and about 60-40% of isobutylene and having an intrinsic viscosity of at least 0.6 which comprises treating the surface only of said formed article with sulfuric acid containing nitric acid to chemically modify the surface of said article without chemically modifying the interior portion of said article.

PAUL E. HARDY.

REFERENCES CITED

The following references are of record in the file of this patent:

UNITED STATES PATENTS

| Number | Name | Date |
| --- | --- | --- |
| 1,928,988 | Watkins | Oct. 3, 1933 |
| 2,102,456 | Brill | Dec. 14, 1937 |
| 2,213,423 | Wiezevich | Sept. 3, 1940 |
| 2,272,398 | Becker et al. | Feb. 10, 1942 |
| 2,274,749 | Smyers | Mar. 3, 1942 |
| 2,400,720 | Staudinger et al. | May 21, 1946 |

FOREIGN PATENTS

| Number | Country | Date |
| --- | --- | --- |
| 17,423 | Australia | Jan. 17, 1935 |
| 513,521 | Great Britain | Oct. 16, 1939 |

OTHER REFERENCES

Official Digest, No. 240 of Nov. 1944, pages 511 to 516 incl.